Nov. 21, 1950  A. H. BURKHOLDER  2,530,680
APPARATUS FOR TREATING TWISTED FILAMENTARY MATERIALS
Filed July 16, 1945
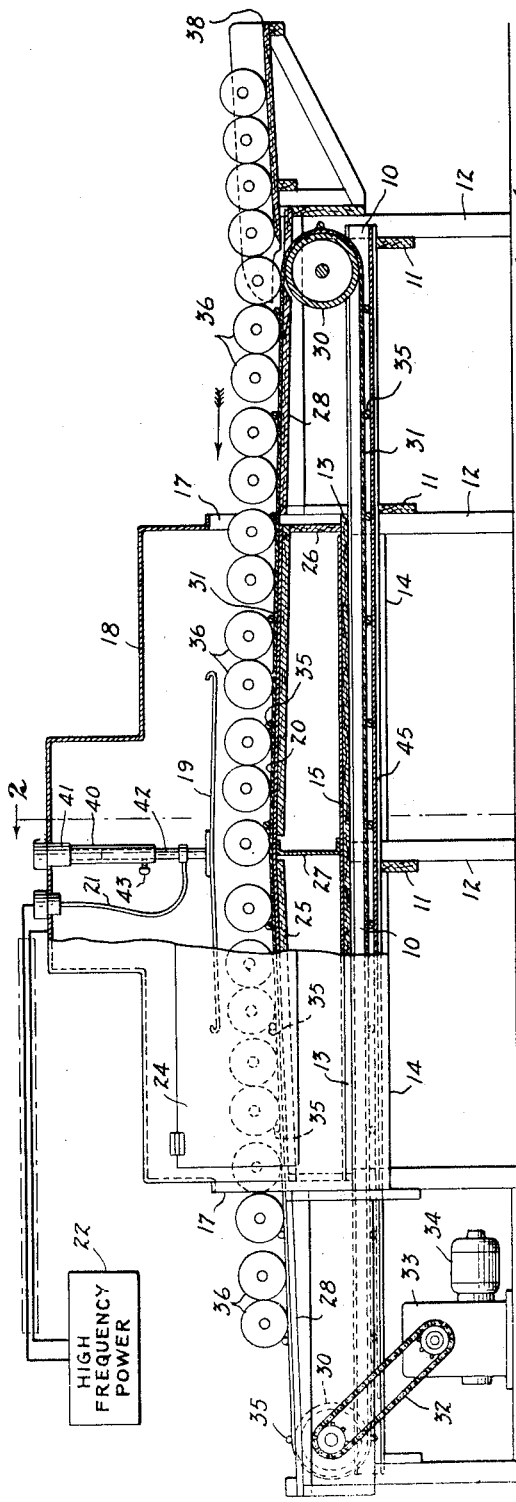
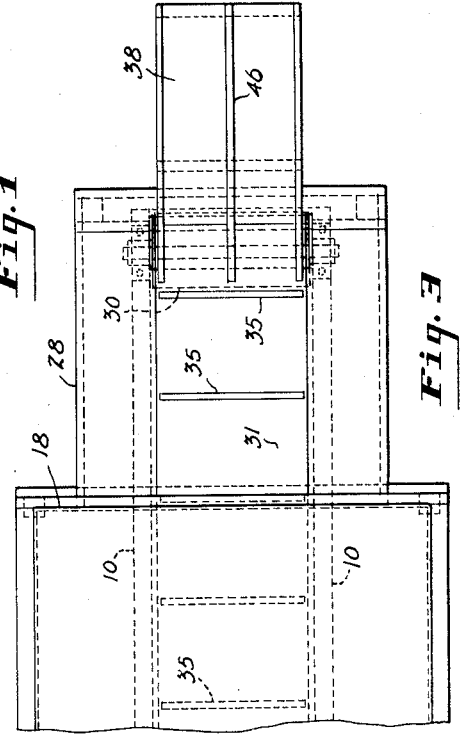
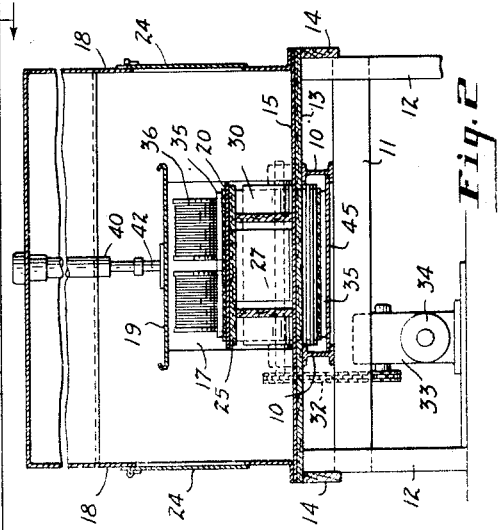
INVENTOR.
Alden H. Burkholder
BY
Frederick L. Bininger
ATTORNEY Patented Nov. 21, 1950

2,530,680

UNITED STATES PATENT OFFICE 2,530,680

APPARATUS FOR TREATING TWISTED FILAMENTARY MATERIALS

Alden H. Burkholder, Cleveland, Ohio, assignor to Industrial Rayon Corporation, Cleveland, Ohio, a corporation of Delaware Application July 16, 1945, Serial No. 605,377

4 Claims. (Cl. 219—47)

This invention relates to reducing the liveliness of twisted filamentary material in package form. More particularly, the invention provides an apparatus which is adapted to subject wound cylindrical packages of twisted filamentary material, e. g., thread or yarn, to the action of a high frequency electrical field.

The co-pending application Serial No. 532,740 of Hayden B. Kline and Alden H. Burkholder, filed on April 26, 1944, and issued as Patent No. 2,421,334 describes generally a process and apparatus for reducing the liveliness, e. g., setting the twist, of a lively twisted filamentary material by means of a high frequency electrical field. The process there described may be practiced in various ways. Thus, for example, lively twisted filamentary material, e. g., viscose rayon tire cord, after being wound on a spool or bobbin may be placed on an endless conveyor and passed through a high frequency electrical field which has been created between two horizontally positioned electrodes. It has been found, however, that when such spools or bobbins of tire cord are placed on their sides and passed through the high frequency field in this form, certain difficulties are sometimes encountered. Due to the difference in the electrical characteristics, i. e., the dielectric loss factor, of the material of which the spool heads are made as compared with the electrical characteristics of the tire cord wound on the spool, over-heating of the spool heads sometimes occurs. This may result in scorching or otherwise damaging the spool heads. Additionally, the cord wound on the spool adjacent to the spool head may also be scorched. Sometimes the endless conveyor, which is advantageously made of a dielectric material such as cotton canvas, may also be subject to some degree of scorching at the points where the spool heads come in contact with it.

This invention provides an apparatus by which the afore-mentioned difficulties may be largely eliminated. In general, the apparatus comprises a pair of spaced substantially parallel electrodes connected to a source of high frequency power, a conveyor adapted to carry cylindrical yarn or thread packages between said electrodes and means for causing said packages while lying on their sides to rotate in the course of their passage between the electrodes. More specifically, the apparatus may include an inclined ramp up which the endless conveyor carries the spool packages, the conveyor reaching a maximum height at a point near the middle of the electrodes between which the spools are being carried. At this middle point, the endless conveyor follows a descending path thereby causing the yarn packages to roll forward until they are stopped by means provided on the endless conveyor. In this way the yarn packages are caused to rotate during the course of the high frequency treatment.

The invention will be described in greater detail by reference to the accompanying drawing in which:

Figure 1 is a side elevation, partly in section, of an apparatus adapted to rotate flanged packages while reducing the liveliness of twisted filamentary material wound on such packages;

Figure 2 is an end elevation, partly in section, of the apparatus taken across line 2—2 of Figure 1.

Figure 3 is a partial plan view of the feeding end of the apparatus.

As shown in the drawing, a pair of I-beams 10 are supported on wooden cross members 11 attached to wooden vertical supporting members 12. A wooden platform 13 rests upon a substantial length of the I-beams 10. This is reinforced by wooden side members 14 and supports substantially all of the superstructure 18 of the apparatus.

The wooden platform 13 is substantially all covered by suitable sheet metal 15, e. g., aluminum, which serves as an electrical conductor and which is connected to one of the electrodes of the apparatus, as will be hereinafter explained. A superstructure, comprising an all metal enclosure 18 rests upon the metal base 15, being fastened thereto by means of bolts or rivets. The enclosure 18 houses a pair of spaced electrodes 19 and 20 which act as opposite plates of a condenser. The enclosure 18 is preferably made of a light-weight current-conducting material, such as aluminum, since it is included in the circuit and since it is designed to restrain the straying of the high frequency electrical field. Side doors 24 extending substantially the length of the enclosure 18 are provided to permit ready access to the interior of the enclosure. Also, openings 17 are provided in the ends of the enclosure for the entry and exit of the spools 36.

The electrodes or opposite condenser plates 19, 20 are positioned substantially in the center of the enclosure 18. Electrode 19 is suspended within the enclosure 18 and it is connected by a conductor 21 to a source of high frequency power indicated generally at 22. The ground connection is joined to the housing of the high frequency source 22 and the enclosure 18. Below the electrode 19 and mounted on a raised wooden platform 25 is the second electrode or plate 20.

The raised platform or ramp 25 is supported at either end on wooden supports 26 which rest, in turn, on the wooden platform 13. The second electrode 20 extends the length and width of the ramp 25 and it is transversely connected by aluminum strips 27 to the metal base 15, the latter being connected to the enclosure 18 as previously explained. The electrode 20 conforms generally to the contour of the ramp 25 and electrode 19 is generally parallel to electrode 20.

The electrodes 19 and 20 are adjustably spaced apart a distance that is slightly greater than the width of the flanges on the spools. The adjustment for properly spacing them comprises a non-conducting tube 40 supported in the top of the enclosure 18 by means of a head 41. Electrode or plate 19 is attached to a rod 42 and the latter is connected to conductor 21. The rod 42 slides within tube 40 and is held therein at a desirable point by means of a set-screw 43.

Electrode 19 is desirably curled at the edges in order to minimize the escape of stray electric currents. Further, electrode 19 is also made substantially wider than the combined width of the spools on the conveyor belt. This is because some of the field, particularly from the edges of the electrode, strays to be picked up by the enclosure walls. The straying of the field weakens its intensity at and near the electrodes' edges. By making electrode 19 wider than the width of two spools, the weakened field is thus carried out beyond the flanged spools and the field through which the spools move is thus of substantially equal intensity throughout an area covering the moving spools.

At either end of the enclosure 18 there are affixed extensions 28 to the platform 25. In substantially the ends of the apron extensions 28 are located drums 30 made of a material having suitable friction characteristics, such as wood. An endless belt 31 of non-conducting material such as canvas travels over the drums 30. One of the drums 30 is actuated by means of a chain 32 drivingly connected to a speed reducer 33 driven in turn by an electric motor 34. The endless belt 31 may be of any width desired suitable to the apparatus. Transverse strips or ribs 35 are positioned at intervals along the belt 31, being fastened thereto by means of string or light cord. These ribs are made of a suitable non-conducting material such as wood and their spacing along the belt 31 is such as to permit spools, when placed on the conveyor, to roll forward approximately 90° in their passage through the high frequency electrical field between the electrodes 19 and 20. To prevent the transverse strips or ribs from contacting the cross members 11, it is desirable to provide a shield 45, preferably of sheet metal and extending substantially the entire length of the I-beams 10. The conveyor and its associated cross ribs may then slide along the surface of the shield 45.

The ramp 25, it will be noted from Figure 1, gradually rises to substantially its center within the enclosure 18 and then gradually drops. This upward and downward sloping permits the flanged spools 36 containing lively twisted filamentary material to rest against the transversely positioned obstructions or ribs 35 on the conveyor belt 31 on the way up and then permits the spools to roll forward to rest against the preceding transversely positioned ribs 35 when the peak of the platform has been passed. The amount of angular roll of a spool can, of course, be desirably controlled by the spacing and size of the obstructions or ribs 35. The spools are advantageously carried through the enclosure 18 in pairs, the ribs being spaced to accommodate at least two spools yet permit an approximate 90° rotation of the spools. The ribs need not be circular in cross-section, but may be of any suitable form. Furthermore, they need not necessarily be made of wood, but any suitable non-conducting material, e. g., heavy cord, plastics, etc. may be used.

To facilitate the feeding of spools of thread to the apparatus, there is provided a loading platform 38 having a slight slope toward the endless belt 35. Flanged spools 36 can be placed on this platform in parallel fashion, their position being determined by adjacent parallel runways separated by a partition 46. The spools 36 thus roll forward, in a directed manner, down the runways to the apron of extension 28 and then onto the endless belt 31. The spools are picked up by the belt and are moved therewith by ribs 35 into the enclosure 18 for treatment. The loading platform 38 extends substantially over the feed end of the drum 30 in order that a pair of spools may be picked up by the endless belt between successive ribs 35. The spools thus travel in parallel pairs into the enclosure backed by the transverse ribs. If desired, a table may abut the discharge apron or extension 28 for the collection of the treated spools or the extension itself on the discharge end may be prolonged to permit an accumulation of treated spools.

In the illustration, platform 25 over which the conveyor 31 travels, is shown as initially sloping upwardly to substantially the intermediate point of the electrodes 19 and 20, then sloping downwardly thereafter. It may be desirable, under certain conditions, to have the platform initially sloping downwardly then upwardly. The electrodes in such an instance can readily be curved to follow such a platform contour, or any other.

In the foregoing description, flanged packages of lively twisted tire cord have been referred to for purposes of illustration. It is to be understood, however, that the apparatus is similarly adaptable to set the twist on packages not having flanges. Such flangeless packages, desirably, should be rotated while going through the high frequency electrical field in order to prevent the possible scorching of the yarn, and to give a more uniform reduction of the liveliness of the twisted yarn or thread. Additionally it is evident that the material wound on the core or bobbin may be any lively twisted filamentary material, e. g., thread, yarn, cord, etc., whether made of natural or artificial materials.

By using the apparatus of this invention, overheating and possible scorching of the heads or flanges of spools having thread or yarn wound thereon is substantially eliminated when such spools are treated while lying on their side. In addition, over-heating of the yarn is minimized and the twist of the yarn or thread wound on the spool is in general more uniformly set. Furthermore, damage to the conveyor due to over-heating is also reduced to a minimum.

I claim:

1. Apparatus for subjecting nonmetallic material to the action of a high frequency electrical field comprising, a pair of spaced electrodes connected to a source of high frequency power, a conveyor adapted to carry cylindrical packages containing nonmetallic material between said electrodes, means cooperating with said conveyor for gravitationally causing the rotation of said packages, said packages resting on their sides on said conveyor to permit their rotation during the travel of the conveyor between the electrodes, and means on said conveyor for limiting the rotation of said packages.

2. An apparatus for subjecting nonmetallic material to the action of a high frequency electrical field comprising a pair of spaced electrodes connected to a source of high frequency power, a conveyor adapted to carry cylindrical packages of said nonmetallic material between said electrodes, means cooperating with said conveyor for gravitationally causing rotation of said packages, said cooperating means comprising a platform over which said conveyor travels, said platform sloping in the one direction to substantially the center of said electrodes and sloping in another direction thereafter, and means transversely positioned on said conveyor adapted to maintain said cylindrical packages thereon and to limit their rotation.

3. Apparatus for subjecting nonmetallic material to the action of a high frequency electrical field comprising a pair of spaced electrodes connected to a source of high frequency power, a conveyor adapted to carry cylindrical packages of said nonmetallic material between said electrodes, means cooperating with said conveyor for gravitationally causing rotation of said packages, said cooperating means comprising a platform over which said conveyor travels, said platform sloping upwardly to substantially the center of said electrodes and sloping downwardly thereafter, and means transversely positioned on said conveyor adapted to maintain said cylindrical packages thereon, said means being spaced to permit said cylindrical packages to rotate approximately 90° when substantially the center of the electrodes has been passed.

4. Apparatus for subjecting nonmetallic material to the action of a high frequency electrical field comprising a pair of spaced electrodes connected to a source of high frequency power, a conveyor adapted to carry nonmetallic flanged spools containing said nonmetallic material between said electrodes, means for gravitationally rotating said flanged spools while on said conveyor, said means comprising a platform over which the conveyor travels, the platform initially sloping upwardly to substantially the center of said electrodes and sloping downwardly thereafter, said electrodes paralleling said conveyor, and means transversely positioned on said conveyor and adapted to maintain said flanged spools thereon, said means being spaced to permit said spools to roll forwardly approximately 90° when substantially the center of the electrodes has been passed.

ALDEN H. BURKHOLDER.

REFERENCES CITED

The following references are of record in the file of this patent:

UNITED STATES PATENTS

| Number | Name | Date |
| --- | --- | --- |
| 1,959,390 | Smith | May 22, 1934 |
| 1,972,489 | Rideout et al | Sept. 4, 1934 |
| 1,998,332 | Page | Apr. 16, 1935 |
| 2,231,457 | Stephen | Feb. 11, 1941 |
| 2,263,681 | Hart | Nov. 25, 1941 |
| 2,288,268 | Crandell | June 30, 1942 |
| 2,343,521 | Benning | Mar. 7, 1944 |
| 2,395,920 | Grotenhuis | Mar. 5, 1946 |
| 2,421,334 | Kline et al | May 27, 1947 |

FOREIGN PATENTS

| Number | Country | Date |
| --- | --- | --- |
| 597,764 | Germany | May 30, 1934 |